United States Patent
Chien et al.

(10) Patent No.: US 8,373,811 B2
(45) Date of Patent: Feb. 12, 2013

(54) LIQUID CRYSTAL DISPLAY DEVICE WITH EACH PIXEL HAVING PLURAL CAPACITORS COUPLING TO SWITCHES AND RELATED DRIVING METHOD

(75) Inventors: Chih-Yuan Chien, Hsin-Chu (TW); Pei-Yi Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 933 days.

(21) Appl. No.: 12/146,466

(22) Filed: Jun. 26, 2008

(65) Prior Publication Data
US 2009/0279006 A1    Nov. 12, 2009

(30) Foreign Application Priority Data
May 7, 2008  (TW) .............................. 97116806 A

(51) Int. Cl.
*G02F 1/1343* (2006.01)
*G02F 1/136* (2006.01)
*G09G 3/36* (2006.01)
*H01L 29/04* (2006.01)

(52) U.S. Cl. ............... 349/38; 349/39; 349/42; 349/43; 349/44; 349/45; 349/46; 349/47; 345/92; 257/59; 257/72

(58) Field of Classification Search ............. 349/38–39, 349/42–47; 345/92; 257/59, 72
See application file for complete search history.

(56) References Cited

U.S. PATENT DOCUMENTS

| 4,738,515 | A  | * | 4/1988  | Okada et al. | .................. | 349/133 |
| 4,973,137 | A  | * | 11/1990 | Kozaki | ........................ | 349/119 |
| 5,091,109 | A  | * | 2/1992  | Takiguchi et al. | ....... | 252/299.61 |
| 6,028,577 | A  | * | 2/2000  | Sakamoto | ..................... | 345/92 |
| 7,215,309 | B2 | * | 5/2007  | Yamato et al. | ................. | 345/87 |
| 7,256,853 | B2 | * | 8/2007  | Ono et al. | ..................... | 349/141 |
| 7,354,807 | B2 | * | 4/2008  | Yu et al. | ........................ | 438/149 |
| 7,830,477 | B2 | * | 11/2010 | Kim | .............................. | 349/108 |

FOREIGN PATENT DOCUMENTS

TW    I272563    2/2007

* cited by examiner

Primary Examiner — Hoan C Nguyen
(74) Attorney, Agent, or Firm — Winston Hsu; Scott Margo

(57) ABSTRACT

A liquid crystal display (LCD) device essentially includes a plurality of data lines, a plurality of gate lines and a plurality of pixel units. Each pixel unit includes a first liquid-crystal capacitor, a second liquid-crystal capacitor, a first switch and a second switch. The first liquid-crystal capacitor of a pixel unit is charged via the first switch of the same pixel unit. The second liquid-crystal capacitor of a pixel unit is charged via the second switch of the same pixel unit and the first switch of a different pixel unit. The sub-pixel voltages corresponding to the first and second liquid-crystal capacitors of the same pixel unit have the same polarity. Furthermore, disclosed is a liquid-crystal display driving method for writing two data signals having same polarity respectively into the first and second liquid-crystal capacitors of a pixel unit via the same date line during two intervals partly overlapped.

10 Claims, 5 Drawing Sheets

LIQUID CRYSTAL DISPLAY DEVICE WITH EACH PIXEL HAVING PLURAL CAPACITORS COUPLING TO SWITCHES AND RELATED DRIVING METHOD

BACKGROUND OF THE INVENTION

1. Field of the Invention

The present invention relates to a liquid crystal display device and related driving method, and more particularly, to a liquid crystal display device and related driving method for performing the LCD driving operation based on the sub-pixel voltages with the same polarity in the capacitors of bright section and dark section of each pixel unit.

2. Description of the Prior Art

Because liquid crystal display (LCD) devices are characterized by thin appearance, low power consumption, and low radiation, LCD devices have been widely applied in various electronic products for panel displaying. In general, the LCD device comprises liquid crystal cells encapsulated between two substrates and a backlight module for providing a light source. The operation of an LCD device is featured by varying voltage drops between opposite sides of the liquid crystal cells for twisting the angles of the liquid crystal molecules of the liquid crystal cells so that the transparency of the liquid crystal cells can be controlled for illustrating images with the aid of the backlight module.

It is well known that each pixel unit of an LCD device can be designed to comprise two sub-pixel units for achieving a wide viewing angle. That is, based on gray level averaging effect of two Gamma curves corresponding to the two sub-pixel units, optimal visual experience can be realized in different viewing angles for having a high-quality wide viewing angle. Please refer to FIG. 1, which is a schematic diagram showing a prior-art LCD device. As shown in FIG. 1, the LCD device 100 comprises a plurality of gate lines 110, a plurality of data lines 120, a plurality of common lines 130, a plurality of pixel units 140, and a source driver 180. Each pixel unit 140 comprises a first switch 141, a second switch 143, a first liquid-crystal capacitor (bright capacitor) 145, and a second liquid-crystal capacitor (dark capacitor) 147. The first switch 141 in conjunction with the first liquid-crystal capacitor 145 forms a sub-pixel unit, and the second switch 143 in conjunction with the second liquid-crystal capacitor 147 forms another sub-pixel unit.

Each first liquid-crystal capacitor 145 is charged via a corresponding data line 120 and the first switch 141 of the same pixel unit 140. Each second liquid-crystal capacitor 147 is charged via a corresponding data line 120, the first switch 141 of different pixel unit 140, and the second switch 143 of the same pixel unit 140. For instance, the first liquid-crystal capacitor C1 of the pixel unit P1 is charged via the data line DL1 and the first switch T1 of the pixel unit P1. The second liquid-crystal capacitor C2 of the pixel unit P1 is charged via the data line DL2, the first switch T3 of the pixel unit P2, and the second switch T2 of the pixel unit P1.

While driving the LCD device 100 based on the column-inversion driving operation, the polarities of data signals corresponding to adjacent data lines are opposite to each other. That is, if the polarity of the data signal SD1 is positive, then the polarity of the data signal SD2 is negative, and vice versa. In other words, if the sub-pixel voltage VB1 corresponding to the first liquid-crystal capacitor C1 is a positive-polarity voltage, then the sub-pixel voltage VD1 corresponding to the second liquid-crystal capacitor C2 is a negative-polarity voltage. However, as the polarities of the sub-pixel voltages corresponding to the first and second liquid-crystal capacitors of each pixel unit are opposite to each other, the sub-pixel voltages with opposite polarities have a significant effect on the angles of the liquid-crystal molecules in the main-slit between the first and second liquid-crystal capacitors, which incurs brightness loss in the main slit. Furthermore, the data signal driving frequency should be increased or even doubled for charging the first liquid-crystal capacitor 145 and the second liquid-crystal capacitor 147 of each pixel unit 140 via different data lines 120, and the power consumption of the source driver 180 is increased accordingly. In view of that, the working temperature of the source driver 180 is increased as a result of the high power consumption, and the lifetime of the source driver 180 is shortened following the increase of the working temperature.

SUMMARY OF THE INVENTION

In accordance with an embodiment of the present invention, a liquid crystal display device capable of performing the LCD driving operation based on the sub-pixel voltages with the same polarity in the capacitors of bright section and dark section of each pixel unit is disclosed. The liquid crystal display device comprises a plurality of data lines, a plurality of gate lines, a plurality of common lines, and a plurality of columns of pixel units.

Each of the data lines is adapted to receive a corresponding data signal. Each of the gate lines is adapted to receive a corresponding gate signal. The common lines are furnished with a common voltage. Each column of pixel units comprises a plurality of pixel units. The nth pixel unit of the mth column of pixel units in the columns of pixel units comprises a first liquid-crystal capacitor, a second liquid-crystal capacitor, a first switch, and a second switch. The first liquid-crystal capacitor comprises a first end coupled to a corresponding common line of the common lines, and a second end. The second liquid-crystal capacitor comprises a first end coupled to the corresponding common line, and a second end. The first switch comprises a first end coupled to the second end of the first liquid-crystal capacitor, a gate coupled to a corresponding gate line of the gate lines, and a second end coupled to a corresponding data line of the data lines. The second switch comprises a first end coupled to the second end of the second liquid-crystal capacitor, a gate coupled to the corresponding gate line, and a second end coupled to the first end of the first switch of a different pixel unit. The second end of the first switch of the different pixel unit is coupled to the corresponding data line.

The present invention further discloses a driving method for driving an LCD device. The LCD device comprises a plurality of data lines, a plurality of gate lines and a plurality of rows of pixel units.

The driving method comprises: writing a first data signal with a first polarity into a first liquid-crystal capacitor of an mth pixel unit of an nth row of pixel units in the rows of pixel units via an mth data line of the data lines and a first switch of the mth pixel unit in the nth row of pixel units during a first interval of a Kth frame time; and writing a second data signal with the first polarity into a second liquid-crystal capacitor of the mth pixel unit in the nth row of pixel units via the mth data line, a first switch of an mth pixel unit of a (n+x)th row of pixel units in the rows of pixel units, and a second switch of the mth pixel unit in the nth row of pixel units during a second interval of the Kth frame time. The numbers K, m and n are positive integers and the number x is an even number. These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the driving method are not meant thereto limit the operating sequence, and any rearrangement of the operating sequence for achieving same functionality is still within the spirit and scope of the invention.

Figure 1:
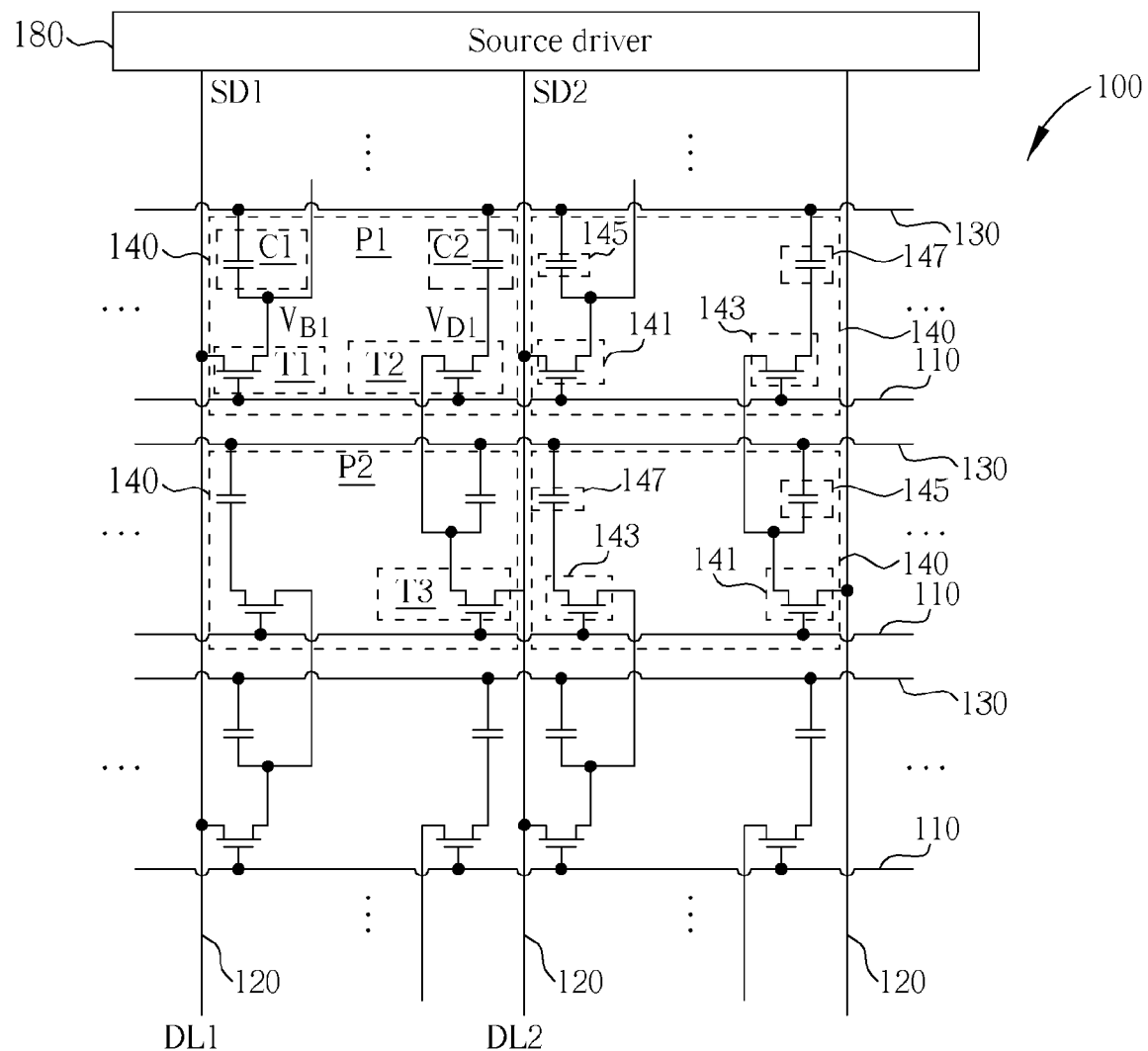
FIG. 1 is a schematic diagram showing a prior-art LCD device.
Figure 2:
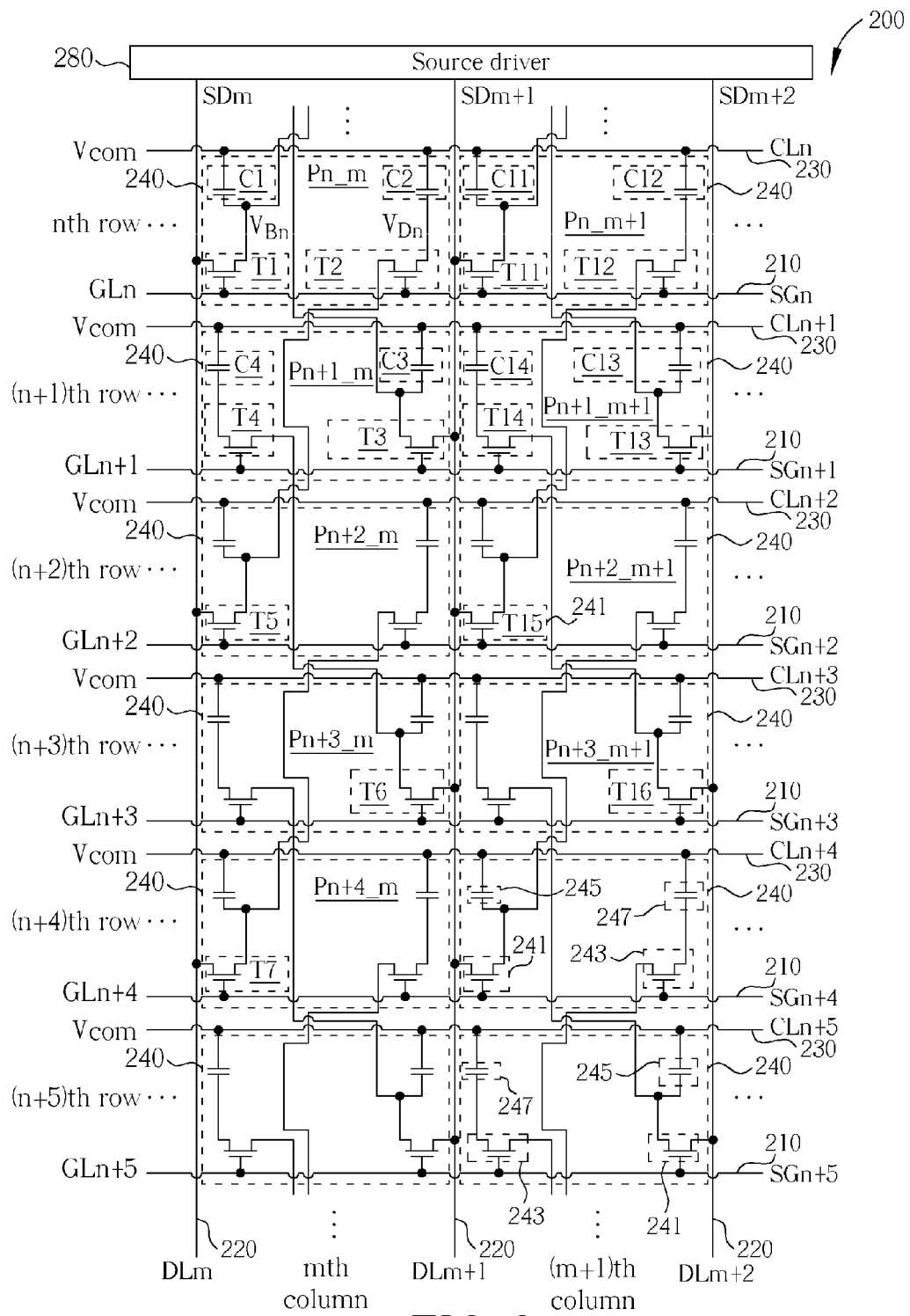
FIG. 2 is a schematic diagram showing an LCD device in accordance with a first embodiment of the present invention.

FIG. 2 is a schematic diagram showing an LCD device in accordance with a first embodiment of the present invention. As shown in FIG. 2, the LCD device 200 comprises a plurality of gate lines 210, a plurality of data lines 220, a plurality of common lines 230, a plurality of columns of pixel units, and a source driver 280. The common lines 230 are furnished with a common voltage Vcom. Each column of pixel units comprises a plurality of pixel units 240. Each pixel unit 240 comprises a first switch 241, a second switch 243, a first liquid-crystal capacitor 245, and a second liquid-crystal capacitor 247. The first liquid-crystal capacitor 245 and the second liquid-crystal capacitor 247 are corresponding to the bright and dark sections of the pixel unit 240 respectively. The source driver 280 is coupled to the plurality of data lines 220 for providing a plurality of data signals. The first switch 241 and the second switch 243 can be metal-oxide-semiconductor (MOS) field effect transistors or thin film transistors.

Each first liquid-crystal capacitor 245 comprises a first end and a second end. The first end of each first liquid-crystal capacitor 245 is coupled to one corresponding common line 230. Each second liquid-crystal capacitor 247 comprises a first end and a second end. The first end of each second liquid-crystal capacitor 247 is coupled to one corresponding common line 230. Each first switch 241 comprises a first end coupled to the second end of one corresponding first liquid-crystal capacitor 245, a second end coupled to one corresponding data line 220, and a gate coupled to one corresponding gate line 210. Each second switch 243 comprises a first end coupled to the second end of one corresponding second liquid-crystal capacitor 247, a second end coupled to the first end of one corresponding first switch 241 in different pixel unit 240, and a gate coupled to one corresponding gate line 210.

For instance, in the nth pixel unit Pn_m of the mth column of pixel units, the first ends of the first liquid-crystal capacitor C1 and the second liquid-crystal capacitor C2 are both coupled to the common line CLn. The gates of the first switch T1 and the second switch T2 are both coupled to the gate line GLn. The first end of the first switch T1 is coupled to the second end of the first liquid-crystal capacitor C1. The first end of the second switch T2 is coupled to the second end of the second liquid-crystal capacitor C2. The second end of the first switch T1 is coupled to the data line DLm. The second end of the second switch T2 is coupled to the first end of the first switch T5 in the (n+2)th pixel unit Pn+2_m of the mth column of pixel units. The second end of the first switch T5 is coupled to the data line DLm. That is, the second ends of the first switch T1 and the first switch T5 are both coupled to the data line DLm, and both the first liquid-crystal capacitor C1 and the second liquid-crystal capacitor C2 are charged by the data signal SDm furnished via the data line DLm.

In the (n+1)th pixel unit Pn+1_m of the mth column of pixel units, the first ends of the first liquid-crystal capacitor C3 and the second liquid-crystal capacitor C4 are both coupled to the common line CLn+1. The gates of the first switch T3 and the second switch T4 are both coupled to the gate line GLn+1. The first end of the first switch T3 is coupled to the second end of the first liquid-crystal capacitor C3. The first end of the second switch T4 is coupled to the second end of the second liquid-crystal capacitor C4. The second end of the first switch T3 is coupled to the data line DLm+1. The second end of the second switch T4 is coupled to the first end of the first switch T6 in the (n+3)th pixel unit Pn+3_m of the mth column of pixel units. The second end of the first switch T6 is coupled to the data line DLm+1. That is, the second ends of the first switch T3 and the first switch T6 are both coupled to the data line DLm+1, and both the first liquid-crystal capacitor C3 and the second liquid-crystal capacitor C4 are charged by the data signal SDm+1 furnished via the data line DLm+1.

In the nth pixel unit Pn_m+1 of the (m+1)th column of pixel units, the first ends of the first liquid-crystal capacitor C11 and the second liquid-crystal capacitor C12 are both coupled to the common line CLn. The gates of the first switch T11 and the second switch T12 are both coupled to the gate line GLn. The first end of the first switch T11 is coupled to the second end of the first liquid-crystal capacitor C11. The first end of the second switch T12 is coupled to the second end of the second liquid-crystal capacitor C12. The second end of the first switch T11 is coupled to the data line DLm+1. The second end of the second switch T12 is coupled to the first end of the first switch T15 in the (n+2)th pixel unit Pn+2_m+1 of the (m+1)th column of pixel units. The second end of the first switch T15 is coupled to the data line DLm+1. That is, the second ends of the first switch T11 and the first switch T15 are both coupled to the data line DLm+1, and both the first liquid-crystal capacitor C11 and the second liquid-crystal capacitor C12 are charged by the data signal SDm+1 furnished via the data line DLm+1.

In the (n+1)th pixel unit Pn+1_m+1 of the (m+1)th column of pixel units, the first ends of the first liquid-crystal capacitor C13 and the second liquid-crystal capacitor C14 are both coupled to the common line CLn+1. The gates of the first switch T13 and the second switch T14 are both coupled to the gate line GLn+1. The first end of the first switch T13 is coupled to the second end of the first liquid-crystal capacitor C13. The first end of the second switch T14 is coupled to the second end of the second liquid-crystal capacitor C14. The second end of the first switch T13 is coupled to the data line DLm+2. The second end of the second switch T14 is coupled to the first end of the first switch T16 in the (n+3)th pixel unit Pn+3_m+1 of the (m+1)th column of pixel units. The second end of the first switch T16 is coupled to the data line DLm+2. That is, the second ends of the first switch T13 and the first switch T16 are both coupled to the data line DLm+2, and both the first liquid-crystal capacitor C13 and the second liquid-crystal capacitor C14 are charged by the data signal SDm+2 furnished via the data line DLm+2.

In summary, each first liquid-crystal capacitor 245 is charged via a corresponding data line 220 and the first switch 241 of the same pixel unit 240. Each second liquid-crystal capacitor 247 is charged via a corresponding data line 220, the first switch 241 of different pixel unit 240, and the second switch 243 of the same pixel unit 240. Furthermore, both the first liquid-crystal capacitor 245 and the second liquid-crystal capacitor 247 of each pixel unit 240 are charged by the data signal furnished via the same data line 220. Accordingly, while driving the LCD device 200 based on the column-inversion driving operation, the sub-pixel voltages corresponding to the first liquid-crystal capacitor 245 and second liquid-crystal capacitor 247 of each pixel unit 240 have the same polarity regardless of different polarities of data signals corresponding to adjacent data lines 220. That is, if the sub-pixel voltage VBn corresponding to the first liquid-crystal capacitor C1 is a positive-polarity voltage, then the sub-pixel voltage VDn corresponding to the second liquid-crystal capacitor C2 is also a positive-polarity voltage, and vice versa. Therefore, brightness loss in the main slit can be reduced significantly in that the sub-pixel voltages with the same polarity have almost no effect on the angles of the liquid-crystal molecules in the main-slit between the first liquid-crystal capacitor 245 and second liquid-crystal capacitor 247 of each pixel unit 240.

Besides, since the first liquid-crystal capacitor 245 and the second liquid-crystal capacitor 247 of each pixel unit 240 are charged via the same data line 220, the data signal driving frequency of the LCD device 200 can be lower than that of the prior-art LCD device, and the power consumption of the LCD device 200 is lowered accordingly. In view of that, the working temperature of the source driver 280 can be decreased as a result of the lower power consumption, and the lifetime of the source driver 280 is extended following the decrease of the working temperature. Moreover, the LCD device 200 is able to display dot-inversion frames based on the column-inversion driving operation in that the adjacent pixel units 240 in vertical or horizontal direction are written via adjacent data lines 220 having data signals with different polarities.

In another embodiment, in the nth pixel unit Pn_m of the mth column of pixel units, the second end of the second switch T2 can be coupled to the first end of the first switch T7 in the (n+4)th pixel unit Pn+4_m of the mth column of pixel units. Since the second end of the first switch T7 is also coupled to the data line DLm, therefore both the first liquid-crystal capacitor C1 and the second liquid-crystal capacitor C2 are also charged by the data signal SDm furnished via the data line DLm for generating the sub-pixel voltages VBn and VDn with the same polarity. In an equivalent embodiment, in the nth pixel unit Pn_m of the mth column of pixel units, the second end of the second switch T2 can be coupled to the first end of the first switch in the (n+x)th pixel unit Pn+x_m of the mth column of pixel units. The numbers m and n are positive integers and the number x is an even number so that the sub-pixel voltages corresponding to the first liquid-crystal capacitor 245 and the second liquid-crystal capacitor 247 of each pixel unit 240 have the same polarity.

Figure 3:
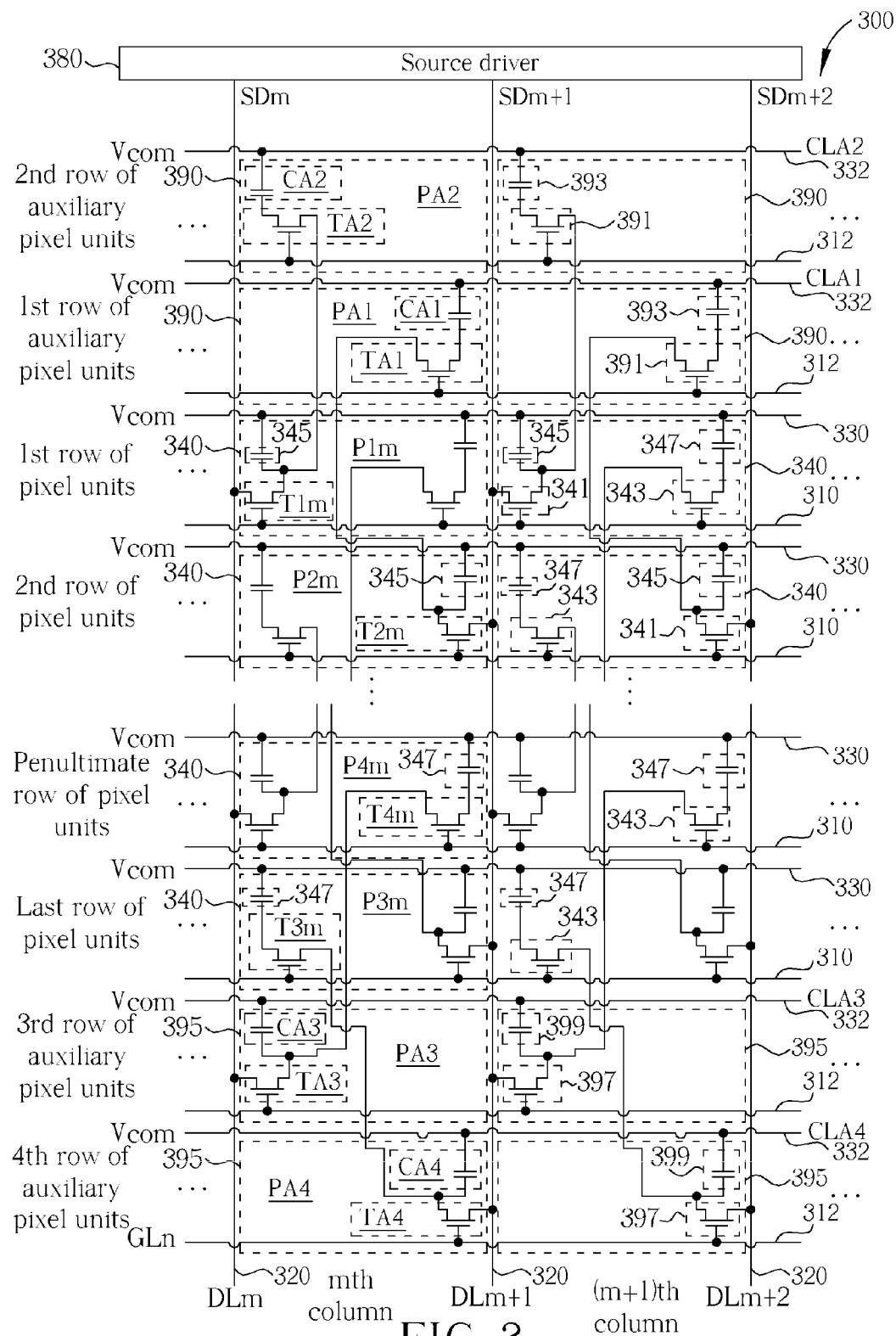
FIG. 3 is a schematic diagram showing an LCD device in accordance with a second embodiment of the present invention.

FIG. 3 is a schematic diagram showing an LCD device in accordance with a second embodiment of the present invention. As shown in FIG. 3, the LCD device 300 comprises a plurality of gate lines 310, a plurality of auxiliary gate lines 312, a plurality of data lines 320, a plurality of common lines 330, a plurality of auxiliary common lines 332, a plurality of rows of pixel units, a plurality of rows of auxiliary pixel units, and a source driver 380. The common lines 330 and the auxiliary common lines 332 are furnished with a common voltage Vcom. Each row of pixel units comprises a plurality of pixel units 340. Each pixel unit 340 comprises a first switch 341, a second switch 343, a first liquid-crystal capacitor 345, and a second liquid-crystal capacitor 347. The plurality of rows of auxiliary pixel units comprise a first row of auxiliary pixel units, a second row of auxiliary pixel units, a third row of auxiliary pixel units and a fourth row of auxiliary pixel units. Each auxiliary gate line 312 is utilized for receiving a corresponding auxiliary gate signal. The source driver 380 is coupled to the plurality of data lines 320 for providing a plurality of data signals. The coupling relationships corresponding to the pixel units 340 disposed between the second and penultimate rows of pixel units are the same as the aforementioned coupling relationships of the LCD device 200 in FIG. 2, and for the sake of brevity, further similar description is omitted.

The first and second rows of auxiliary pixel units comprise a plurality of top-margin auxiliary pixel units 390. The third and fourth rows of auxiliary pixel units comprise a plurality of bottom-margin auxiliary pixel units 395. Each top-margin auxiliary pixel unit 390 comprises a first auxiliary switch 391 and a first auxiliary capacitor 393. Each bottom-margin auxiliary pixel unit 395 comprises a second auxiliary switch 397 and a second auxiliary capacitor 399. The first switch 341, the second switch 343, the first auxiliary switch 391 and the second auxiliary switch 397 can be MOS field effect transistors or thin film transistors.

Each first auxiliary capacitor 393 comprises a first end and a second end. The first end of each first auxiliary capacitor 393 is coupled to one corresponding auxiliary common line 332. Each first auxiliary switch 391 comprises a first end coupled to the second end of one corresponding first auxiliary capacitor 393, a second end coupled to one corresponding first switch 341, and a gate coupled to one corresponding auxiliary gate line 312. Each second auxiliary capacitor 399 comprises a first end and a second end. The first end of each second auxiliary capacitor 399 is coupled to one corresponding auxiliary common line 332. Each second auxiliary switch 397 comprises a first end coupled to the second end of one corresponding second auxiliary capacitor 399, a second end coupled to one corresponding data line 320, and a gate coupled to one corresponding auxiliary gate line 312. The first end of each second auxiliary switch 397 is further coupled to one corresponding second switch 343.

For instance, in the mth top-margin auxiliary pixel unit PA1 of the first row of auxiliary pixel units, the first end of the first auxiliary capacitor CA1 is coupled to the auxiliary common line CLA1. The first end of the first auxiliary switch TA1 is coupled to the second end of the first auxiliary capacitor CA1. The second end of the first auxiliary switch TA1 is coupled to the first switch T2m in the mth pixel unit P2m of the second row of pixel units. In the mth top-margin auxiliary pixel unit PA2 of the second row of auxiliary pixel units, the first end of the first auxiliary capacitor CA2 is coupled to the auxiliary common line CLA2. The first end of the first auxiliary switch TA2 is coupled to the second end of the first auxiliary capacitor CA2. The second end of the first auxiliary switch TA2 is coupled to the first switch T1m in the mth pixel unit P1m of the first row of pixel units.

In the mth bottom-margin auxiliary pixel unit PA3 of the third row of auxiliary pixel units, the first end of the second auxiliary capacitor CA3 is coupled to the auxiliary common line CLA3. The first end of the second auxiliary switch TA3 is coupled to the second end of the second auxiliary capacitor CA3. The second end of the second auxiliary switch TA3 is coupled to the data line DLm. The first end of the second auxiliary switch TA3 is further coupled to the second switch T4m in the mth pixel unit P4m of the penultimate row of pixel units. In the mth bottom-margin auxiliary pixel unit PA4 of the fourth row of auxiliary pixel units, the first end of the second auxiliary capacitor CA4 is coupled to the auxiliary common line CLA4. The first end of the second auxiliary switch TA4 is coupled to the second end of the second auxiliary capacitor CA4. The second end of the second auxiliary switch TA4 is coupled to the data line DLm+1. The first end of the second auxiliary switch TA4 is further coupled to the second switch T3m in the mth pixel unit P3m of the last row of pixel units.

With the aid of the first and second rows of auxiliary pixel units, the data writing operations for writing corresponding data signals into the first liquid-crystal capacitors 345 of the first and second rows of pixel units can be processed accurately. In other words, without the aid of the first and second rows of auxiliary pixel units, the data writing operations for writing corresponding data signals into the first liquid-crystal capacitors 345 of the first and second rows of pixel units cannot be processed accurately in that the charging processes for the first liquid-crystal capacitors 345 of the first and second rows of pixel units are performed without the corresponding second liquid-crystal capacitors 347 or the equivalent first auxiliary capacitors 393. With the aid of the third and fourth rows of auxiliary pixel units, the data writing operations for writing corresponding data signals into the second liquid-crystal capacitors 347 of the last and penultimate rows of pixel units can be processed accurately, and the sub-pixel voltages corresponding to the first liquid-crystal capacitors 345 and the second liquid-crystal capacitors 347 of each pixel unit 340 of the last and penultimate rows of pixel units have the same polarity. Without the aid of the third and fourth rows of auxiliary pixel units, the data writing operations for writing corresponding data signals into the second liquid-crystal capacitors 347 of the last and penultimate rows of pixel units cannot be processed.

In summary, while driving the LCD device 300 of the present invention based on the column-inversion driving operation, the sub-pixel voltages corresponding to the first liquid-crystal capacitor 345 and second liquid-crystal capacitor 347 of each pixel unit 340 have the same polarity regardless of different polarities of data signals corresponding to adjacent data lines 320. Therefore, brightness loss in the main slit can be reduced significantly in that the sub-pixel voltages with the same polarity have almost no effect on the angles of the liquid-crystal molecules in the main-slit between the first liquid-crystal capacitor 345 and second liquid-crystal capacitor 347 of each pixel unit 340.

Furthermore, the charging process for each first liquid-crystal capacitor 345 is performed with one corresponding second liquid-crystal capacitor 347 or one equivalent first auxiliary capacitor 393 so that the data writing operation for writing one corresponding data signal into each first liquid-crystal capacitor 345 can be processed accurately. Also, the charging process for each second liquid-crystal capacitor 347 is performed with one corresponding first liquid-crystal capacitor 345 or one equivalent second auxiliary capacitor 399 so that the data writing operation for writing one corresponding data signal into each second liquid-crystal capacitor 347 can be processed accurately.

Besides, since the first liquid-crystal capacitor 345 and the second liquid-crystal capacitor 347 of each pixel unit 340 are charged via the same data line 320, the data signal driving frequency of the LCD device 300 can be lower than that of the prior-art LCD device, and the power consumption of the LCD device 300 is lowered accordingly. In view of that, the working temperature of the source driver 380 can be decreased as a result of the lower power consumption, and the lifetime of the source driver 380 is extended following the decrease of the working temperature. Moreover, the LCD device 300 is able to display dot-inversion frames based on the column-inversion driving operation in that the adjacent pixel units 340 in vertical or horizontal direction are written via adjacent data lines 320 having data signals with different polarities.

Figure 4:
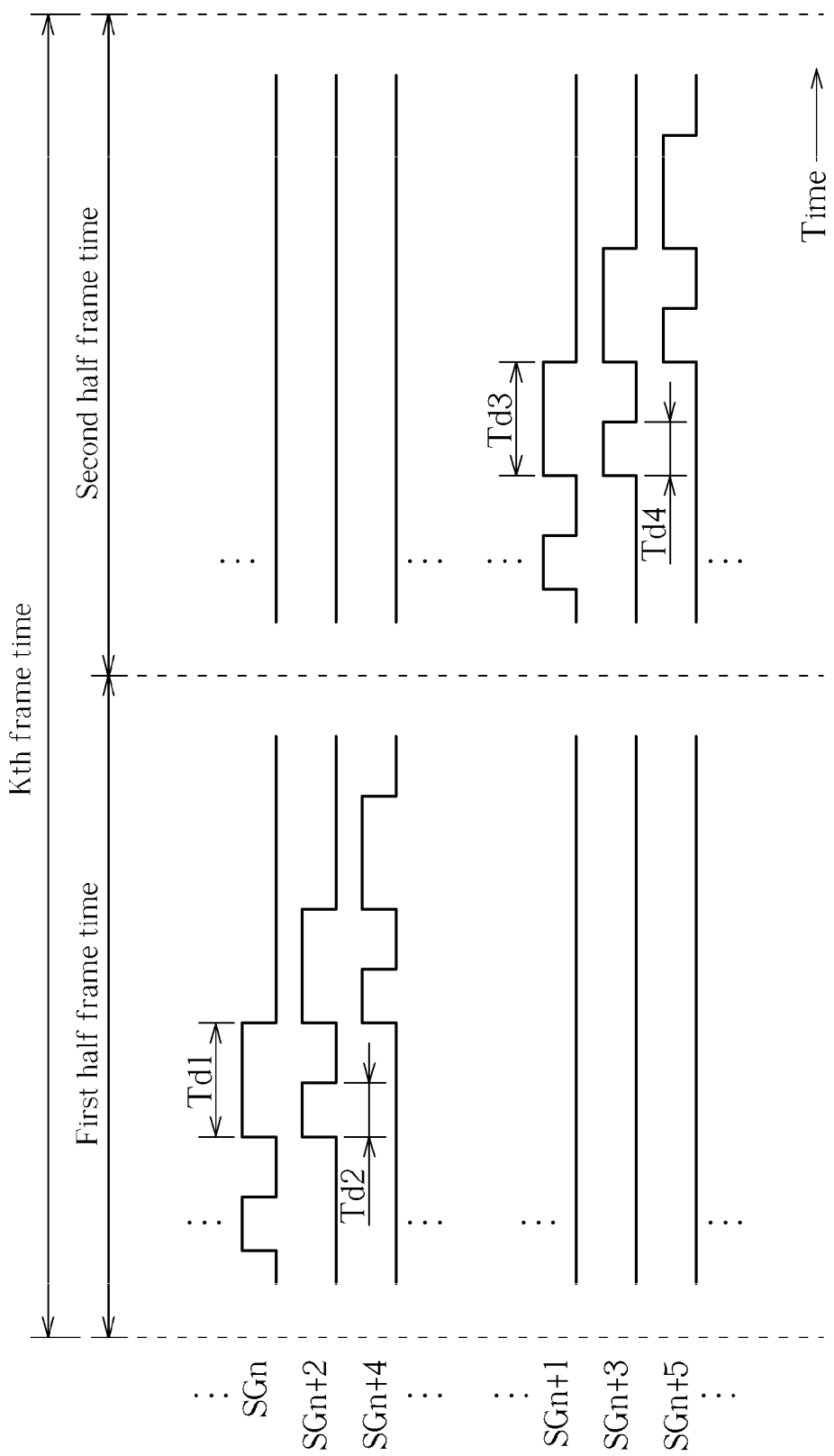
FIG. 4 is a timing diagram schematically showing the related signal waveforms regarding the driving operation of the LCD device in FIG. 2, having time along the abscissa.
Figure 5:
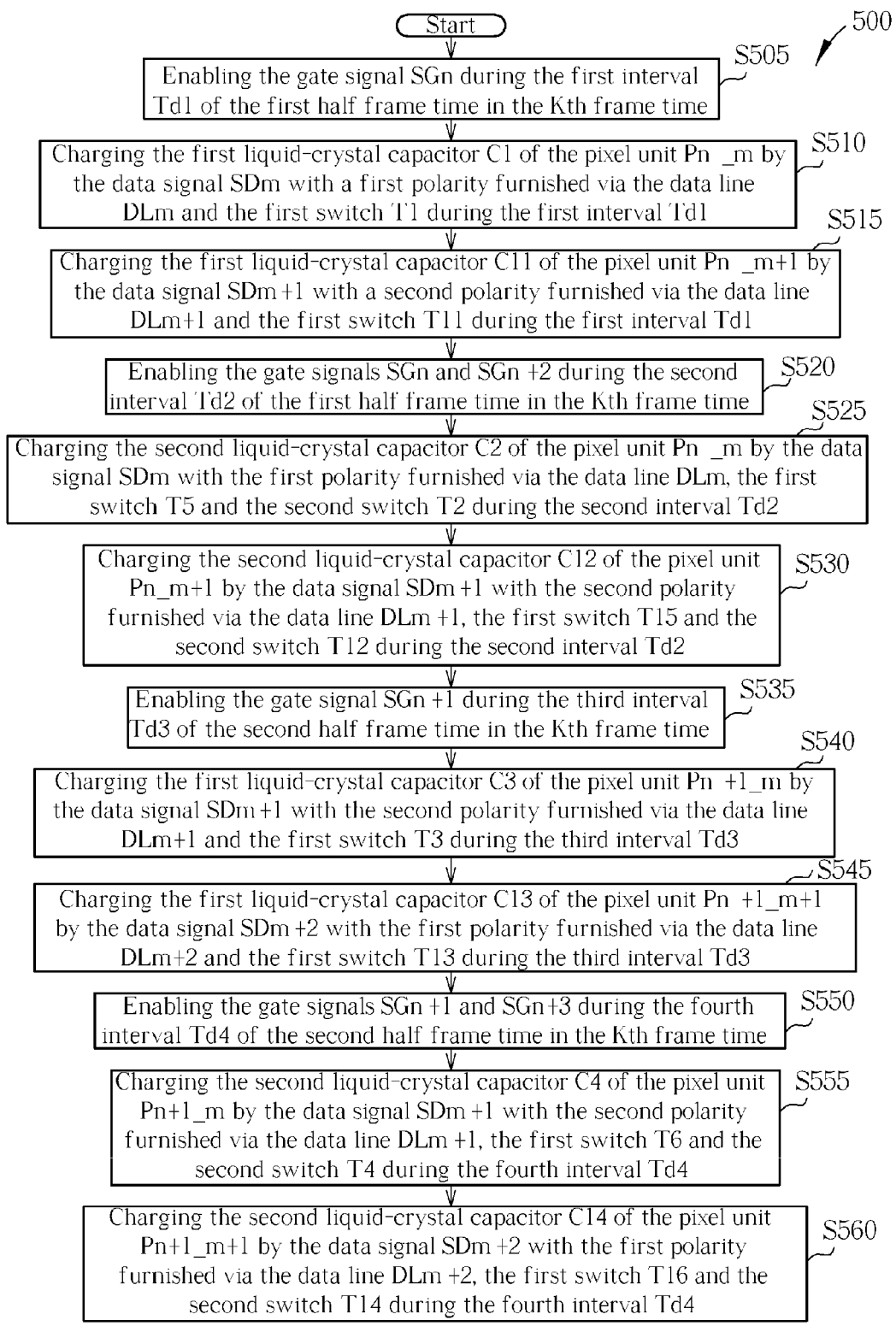
FIG. 5 is a flowchart depicting a driving method for driving the LCD device in FIG. 2 based on the related signal waveforms in FIG. 4.

FIG. 4 is a timing diagram schematically showing the related signal waveforms regarding the driving operation of the LCD device in FIG. 2, having time along the abscissa. The signal waveforms in FIG. 4, from top to bottom, are a plurality of odd gate signals SGn, SGn+2, SGn+4, etc., and a plurality of even gate signals SGn+1, SGn+3, SGn+5, etc. As shown in FIG. 4, the Kth frame time in the driving operation of the LCD device 200 is divided into the first half frame time and the second half frame time. Please refer to FIG. 5 in conjunction with FIGS. 2 and 4. FIG. 5 is a flowchart depicting a driving method for driving the LCD device in FIG. 2 based on the related signal waveforms in FIG. 4. As shown in FIG. 5, the driving method 500 comprises the following steps:

Step S505: enabling the gate signal SGn during the first interval Td1 of the first half frame time in the Kth frame time;

Step S510: charging the first liquid-crystal capacitor C1 of the pixel unit Pn_m by the data signal SDm with a first polarity furnished via the data line DLm and the first switch T1 of the mth pixel unit Pn_m of the nth row of pixel units based on the enabled gate signal SGn during the first interval Td1;

Step S515: charging the first liquid-crystal capacitor C11 of the pixel unit Pn_m+1 by the data signal SDm+1 with a second polarity furnished via the data line DLm+1 and the first switch T11 of the (m+1)th pixel unit Pn_m+1 of the nth row of pixel units based on the enabled gate signal SGn during the first interval Td1;

Step S520: enabling the gate signals SGn and SGn+2 during the second interval Td2 of the first half frame time in the Kth frame time;

Step S525: charging the second liquid-crystal capacitor C2 of the pixel unit Pn_m by the data signal SDm with the first polarity furnished via the data line DLm, the first switch T5 of the mth pixel unit Pn+2_m of the (n+2)th row of pixel units, and the second switch T2 of the pixel unit Pn_m based on the enabled gate signals SGn and SGn+2 during the second interval Td2;

Step S530: charging the second liquid-crystal capacitor C12 of the pixel unit Pn_m+1 by the data signal SDm+1 with the second polarity furnished via the data line DLm+1, the first switch T15 of the (m+1)th pixel unit Pn+2_m+1 of the (n+2)th row of pixel units, and the second switch T12 of the pixel unit Pn_m+1 based on the enabled gate signals SGn and SGn+2 during the second interval Td2;

Step S535: enabling the gate signal SGn+1 during the third interval Td3 of the second half frame time in the Kth frame time;

Step S540: charging the first liquid-crystal capacitor C3 of the pixel unit Pn+1_m by the data signal SDm+1 with the second polarity furnished via the data line DLm+1 and the first switch T3 of the mth pixel unit Pn+1_m of the (n+1)th row of pixel units based on the enabled gate signal SGn+1 during the third interval Td3;

Step S545: charging the first liquid-crystal capacitor C13 of the pixel unit Pn+1_m+1 by the data signal SDm+2 with the first polarity furnished via the data line DLm+2 and the first switch T13 of the (m+1)th pixel unit Pn+1_m+1 of the (n+1)th row of pixel units based on the enabled gate signal SGn+1 during the third interval Td3;

Step S550: enabling the gate signals SGn+1 and SGn+3 during the fourth interval Td4 of the second half frame time in the Kth frame time;

Step S555: charging the second liquid-crystal capacitor C4 of the pixel unit Pn+1_m by the data signal SDm+1 with the second polarity furnished via the data line DLm+1, the first switch T6 of the mth pixel unit Pn+3_m of the (n+3)th row of pixel units, and the second switch T4 of the pixel unit Pn+1_m based on the enabled gate signals SGn+1 and SGn+3 during the fourth interval Td4; and Step S560: charging the second liquid-crystal capacitor C14 of the pixel unit Pn+1_m+1 by the data signal SDm+2 with the first polarity furnished via the data line DLm+2, the first switch T16 of the (m+1)th pixel unit Pn+3_m+1 of the (n+3)th row of pixel units, and the second switch T14 of the pixel unit Pn+1_m+1 based on the enabled gate signals SGn+1 and SGn+3 during the fourth interval Td4.

In the driving method 500 described above, the numbers K, m and n are positive integers, and the first polarity is opposite to the second polarity. That is, if the first polarity is positive, then the second polarity is negative, and vice versa. The first interval Td1 and the second interval Td2 are partly overlapped, or alternatively the second interval Td2 is part of the first interval Td1. Similarly, the third interval Td3 and the fourth interval Td4 are partly overlapped, or alternatively the fourth interval Td4 is part of the third interval Td3. In one embodiment, the first half frame time is prior to the second half frame time as shown in the timing diagram in FIG. 4. In another embodiment, the second half frame time can be prior to the first half frame time without affecting the performance of the LCD device 200.

In an equivalent embodiment, the pixel units Pn+2_m, Pn+2_m+1, Pn+3_m and Pn+3_m+1 in steps of the driving method 500 can be replaced with Pn+x_m, Pn+x_m+1, Pn+x+1_m and Pn+x+1_m+1 respectively. The number x is an even number so that the sub-pixel voltages corresponding to the first liquid-crystal capacitor and the second liquid-crystal capacitor of each pixel unit still have the same polarity in the column-inversion driving operation. Furthermore, the data signal of each data line retains the same polarity in each frame time, and the polarity switching process corresponding to each data signal occurs only when switching frames. Accordingly, the polarity switching frequency of each data signal can be reduced, and therefore the power consumption of the LCD device is reduced so that the LCD device can be operated in a lower working temperature for extending the lifetime of the LCD device.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display device comprising:
   a plurality of data lines, each of the data lines being adapted to receive a corresponding data signal;
   a plurality of gate lines, each of the gate lines being adapted to receive a corresponding gate signal;
   a plurality of common lines for receiving a common voltage; and
   a plurality of columns of pixel units, each column of pixel units comprising a plurality of pixel units, an nth pixel unit of an mth column of pixel units in the columns of pixel units comprising:
      a first liquid-crystal capacitor comprising a first end coupled to a corresponding common line of the common lines, and a second end;
      a second liquid-crystal capacitor comprising a first end coupled to the corresponding common line, and a second end;
      a first switch comprising a first end coupled to the second end of the first liquid-crystal capacitor, a gate coupled to a corresponding gate line of the gate lines, and a second end coupled to a first data line of the data lines; and
      a second switch comprising a first end coupled to the second end of the second liquid-crystal capacitor, a gate coupled to the corresponding gate line, and a second end coupled to the first end of the first switch of a different pixel unit, wherein the different pixel unit is a (n+x)th pixel unit of the mth column of pixel units; wherein m and n are positive integers, and x is an even number;
   wherein the second end of the first switch of the different pixel unit is coupled to the first data line.

2. The liquid crystal display device of claim 1, wherein x is equal to 2.

3. The liquid crystal display device of claim 1, wherein:
   the second end of the first switch in the nth pixel unit of the mth column of pixel units is coupled to an mth data line of the data lines; and
   the second end of the first switch in a (n+2)th pixel unit of the mth column of pixel units is coupled to the mth data line;
   wherein the first end of the first switch in the (n+2)th pixel unit of the mth column of pixel units is coupled to the second end of the second switch in the nth pixel unit of the mth column of pixel units.

4. The liquid crystal display device of claim 3, wherein:
   the second end of the first switch in a (n+1)th pixel unit of the mth column of pixel units is coupled to a (m+1)th data line of the data lines; and
   the second end of the first switch in a (n+3)th pixel unit of the mth column of pixel units is coupled to the (m+1)th data line;
   wherein the first end of the first switch in the (n+3)th pixel unit of the mth column of pixel units is coupled to the second end of the second switch in the (n+1)th pixel unit of the mth column of pixel units.

5. The liquid crystal display device of claim 1, wherein:
   the second end of the first switch in an nth pixel unit of a (m+1)th column of pixel units of the columns of pixel units is coupled to a (m+1)th data line of the data lines; and
   the second end of the first switch in a (n+2)th pixel unit of the (m+1)th column of pixel units is coupled to the (m+1)th data line;
   wherein the first end of the first switch in a (n+2)th pixel unit of the (m+1)th column of pixel units is coupled to the second end of the second switch in the nth pixel unit of the (m+1)th column of pixel units.

6. The liquid crystal display device of claim 5, wherein:
   the second end of the first switch in a (n+1)th pixel unit of the (m+1)th column of pixel units is coupled to a (m+2)th data line of the data lines; and the second end of the first switch in a (n+3)th pixel unit of the (m+1)th column of pixel units is coupled to the (m+2)th data line;

wherein the first end of the first switch in the (n+3)th pixel unit of the (m+1)th column of pixel units is coupled to the second end of the second switch in the (n+1)th pixel unit of the (m+1)th column of pixel units.

7. The liquid crystal display device of claim 1, further comprising:
   a first auxiliary gate line adjacent to a first gate line of the gate lines, the first auxiliary gate line being adapted to receive a first auxiliary gate signal;
   a second auxiliary gate line adjacent to the first auxiliary gate line, the second auxiliary gate line being adapted to receive a second auxiliary gate signal;
   a first auxiliary common line for receiving the common voltage;
   a second auxiliary common line for receiving the common voltage;
   a first row of auxiliary pixel units comprising a plurality of auxiliary pixel units, each of the auxiliary pixel units in the first row of auxiliary pixel units comprising:
      a first auxiliary capacitor comprising a first end coupled to the first auxiliary common line, and a second end; and
      a first auxiliary switch comprising a first end coupled to the second end of the first auxiliary capacitor, a gate coupled to the first auxiliary gate line, and a second end coupled to the first end of a corresponding first switch; and
   a second row of auxiliary pixel units comprising a plurality of auxiliary pixel units, each of the auxiliary pixel units in the second row of auxiliary pixel units comprising:
      a second auxiliary capacitor comprising a first end coupled to the second auxiliary common line, and a second end; and
      a second auxiliary switch comprising a first end coupled to the second end of the second auxiliary capacitor, a gate coupled to the second auxiliary gate line, and a second end coupled to the first end of a corresponding first switch.

8. The liquid crystal display device of claim 7, wherein:
   the second end of the first auxiliary switch in an mth auxiliary pixel unit of the first row of auxiliary pixel units is coupled to the first end of the first switch in a second pixel unit of the mth column of pixel units; and
   the second end of the second auxiliary switch in an mth auxiliary pixel unit of the second row of auxiliary pixel units is coupled to the first end of the first switch in a first pixel unit of the mth column of pixel units.

9. The liquid crystal display device of claim 1, further comprising:
   a first auxiliary gate line adjacent to a last gate line of the gate lines, the first auxiliary gate line being adapted to receive a first auxiliary gate signal;
   a second auxiliary gate line adjacent to the first auxiliary gate line, the second auxiliary gate line being adapted to receive a second auxiliary gate signal;
   a first auxiliary common line for receiving the common voltage;
   a second auxiliary common line for receiving the common voltage;
   a first row of auxiliary pixel units comprising a plurality of auxiliary pixel units, each of the auxiliary pixel units in the first row of auxiliary pixel units comprising:
      a first auxiliary switch comprising a first end coupled to the second end of a corresponding second switch, a gate coupled to the first auxiliary gate line, and a second end coupled to a second data line of the data lines; and
      a first auxiliary capacitor comprising a first end coupled to the first auxiliary common line, and a second end coupled to the first end of the first auxiliary switch; and
   a second row of auxiliary pixel units comprising a plurality of auxiliary pixel units, each of the auxiliary pixel units in the second row of auxiliary pixel units comprising:
      a second auxiliary switch comprising a first end coupled to the second end of a corresponding second switch, a gate coupled to the second auxiliary gate line, and a second end coupled to a third data line of the data lines; and
      a second auxiliary capacitor comprising a first end coupled to the second auxiliary common line, and a second end coupled to the first end of the second auxiliary switch.

10. The liquid crystal display device of claim 9, wherein:
   the first end of the first auxiliary switch in an mth auxiliary pixel unit of the first row of auxiliary pixel units is coupled to the second end of the second switch in a penultimate pixel unit of the mth column of pixel units; and
   the first end of the second auxiliary switch in an mth auxiliary pixel unit of the second row of auxiliary pixel units is coupled to the second end of the second switch in a last pixel unit of the mth column of pixel units.

* * * * *